W. V. TURNER.
ELECTRIC FLUID PRESSURE BRAKE.
APPLICATION FILED JULY 28, 1915.
1,183,913.
Patented May 23, 1916.
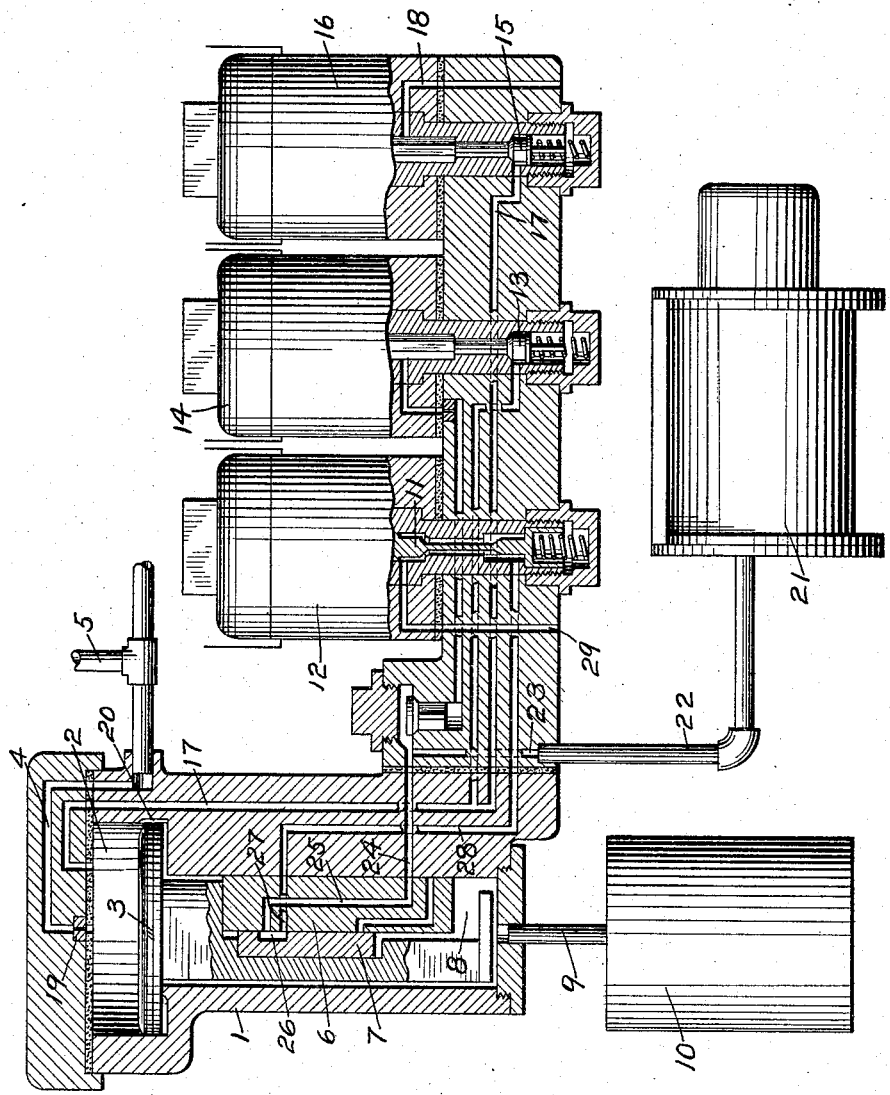
WITNESSES
H. W. Crowell
A. M. Clements
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTRIC FLUID-PRESSURE BRAKE.

1,183,913.

Specification of Letters Patent. Patented May 23, 1916.

Application filed July 28, 1915. Serial No. 42,410.

*To all whom it may concern:*

Be it known that I, WALTER V. TURNER, a citizen of the United States, residing at Wilkinsburg, in the county of Allegheny and State of Pennsylvania, have invented new and useful Improvements in Electric Fluid-Pressure Brakes, of which the following is a specification.

This invention relates to electro-pneumatic brakes, and more particularly to that type in which the brakes may be controlled either electrically or pneumatically.

It has heretofore been proposed to provide a brake apparatus having an equalizing valve device adapted to be operated either by a reduction in brake pipe pressure or by venting fluid from the piston of the valve device by means of an electrically controlled valve.

When the brakes are applied by the operation of the electrically controlled valve, if the brake valve device is in the usual release or running position, it will be evident that fluid will be supplied to the brake pipe in the usual manner and consequently the brake pipe pressure may be increased sufficiently to effect the release of the brakes, even though the electrically controlled valve remains in open position. This would not be the case, of course, where the brake valve handle is manipulated to energize the magnet controlling the electric application valve, since the handle would then be shifted from release or running position, but in some cases, the electric application magnet may be energized without manipulation of the brake valve, as by means of the well known "dead man" feature, a track trip, or similar device.

In order to prevent the release of the brakes under conditions where fluid is supplied to the brake pipe when the electric application valve is operated, the principal object of my invention is to provide means for restricting flow from the brake pipe to the piston of the equalizing valve device, so that the electrically controlled application valve can vent fluid from said piston at a greater rate than fluid can flow from the brake pipe thereto.

In the accompanying drawing, the single figure is a sectional view of an electro-pneumatic brake apparatus for a vehicle, with my improvement embodied therein.

My improvement may be employed with any desired type of brake controlling valve device adapted to be operated upon a reduction in brake pipe pressure to effect an application of the brakes, such as the ordinary triple valve device shown in the drawing, which comprises a casing 1 having a piston chamber 2 containing piston 3 and connected by passage 4 with brake pipe 5. Piston 3 operates the usual main and graduating valves 6 and 7, which are contained in valve chamber 8, connected by pipe 9 to auxiliary reservoir 10. The electric portion may comprise a release valve 11 controlled by magnet 12, a service application valve 13 controlled by a magnet 14, and an emergency valve 15 adapted to be operated by a magnet 16 for venting fluid from piston chamber 2 through a passage 17 to an atmospheric exhaust port 18. According to my invention, the communication from the brake pipe to the piston chamber 2 is restricted, as by inserting a choke plug 19 in passage 4, or said communication may be restricted in any other desired manner.

In operation, fluid supplied to the brake pipe 5 flows to the piston chamber 2 and thence through the usual feed groove 20, charging valve chamber 8 and auxiliary reservoir 10, and the triple valve parts being in release position, the brake cylinder 21 is connected to the exhaust through pipe 22, passage 23, passage 24, port 25, cavity 26, port 27, passage 28, and past the open electric release valve, to exhaust port 29. If an emergency application of the brakes is effected by energizing the magnet 16, the valve 15 will be opened, and fluid vented from the piston chamber 2, through passage 17, to effect a reduction in pressure in said chamber and thus cause movement of the triple valve parts to emergency application position. If the brake valve is in release or running position at this time, fluid will be fed to the brake pipe in the usual manner, but since communication from the brake pipe to the piston chamber 2 is restricted, it will be evident that fluid can be vented from the piston chamber, by operation of the valve 15, at a greater rate than fluid is supplied from the brake pipe to said chamber, and consequently the piston will not be moved to release position and the brakes may therefore be held applied electrically, as long as the emergency magnet remains energized.

Having now described my invention, what I claim as new and desire to secure by Letters Patent, is:

1. In an electro-pneumatic brake, the combination with a brake pipe and a valve device operated upon a reduction in brake pipe pressure for effecting an application of the brakes, of an electrically controlled valve for also reducing the pressure on said valve device to effect an application of the brakes, the communication for supplying fluid from the brake pipe to said valve device being restricted.

2. In an electro-pneumatic brake, the combination with a brake pipe and a valve device operated upon a reduction in brake pipe pressure for effecting an application of the brakes, of an electrically controlled valve for also reducing the pressure on said valve device to effect an application of the brakes, flow from the brake pipe to said valve device being restricted, so that fluid is vented from said valve device, by operation of the electrically controlled valve, at a greater rate than fluid can flow from the brake pipe to said valve device.

3. In an electro-pneumatic brake, the combination with a brake pipe, of a valve device having a piston contained in a piston chamber with a restricted communication to the brake pipe, and operated upon a reduction in brake pipe pressure for effecting an application of the brakes and an electrically controlled valve for venting fluid from said piston chamber at a greater rate than fluid can flow from the brake pipe to said chamber.

4. In an electro-pneumatic brake, the combination with a brake pipe, of a piston contained in a piston chamber having a restricted communication with the brake pipe, valve means operated by said piston upon a reduction in pressure in the piston chamber for effecting an application of the brakes, and an electrically controlled valve for also venting fluid from said piston chamber.

In testimony whereof I have hereunto set my hand.

WALTER V. TURNER.

Witnesses:
A. M. CLEMENTS,
JOHN H. EICHER.